INVENTOR.
JOHN G. BOOTH

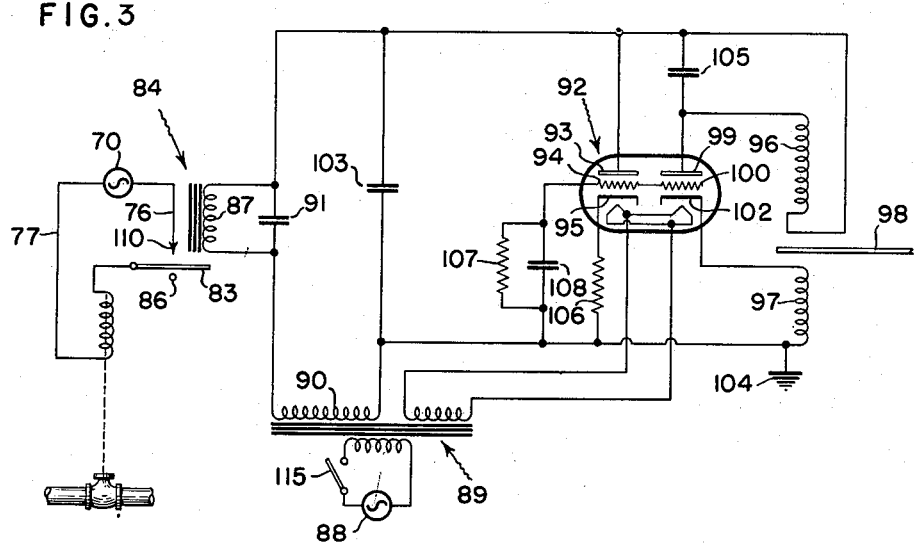
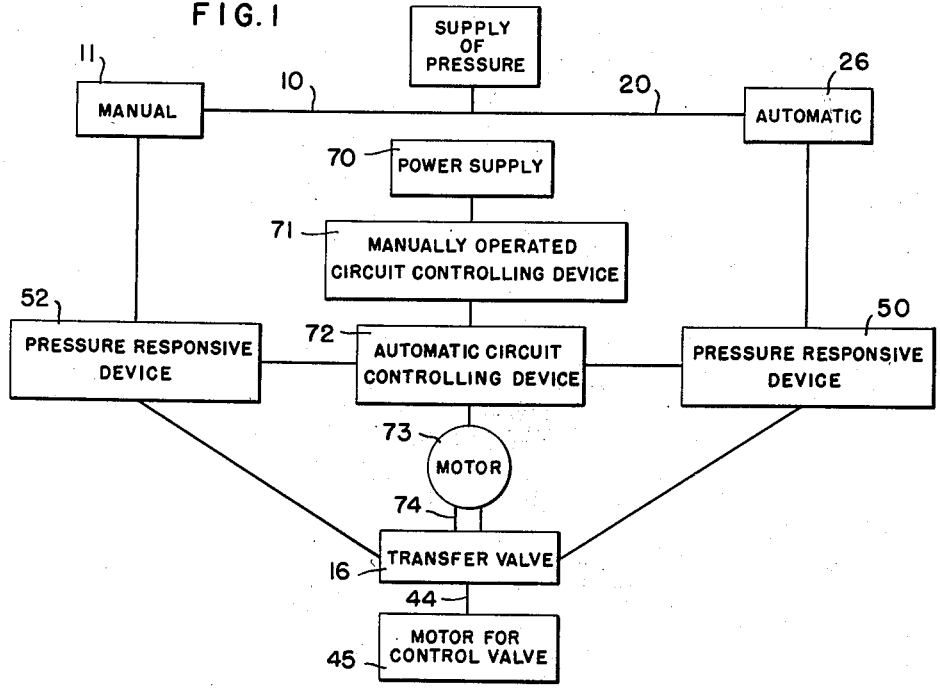

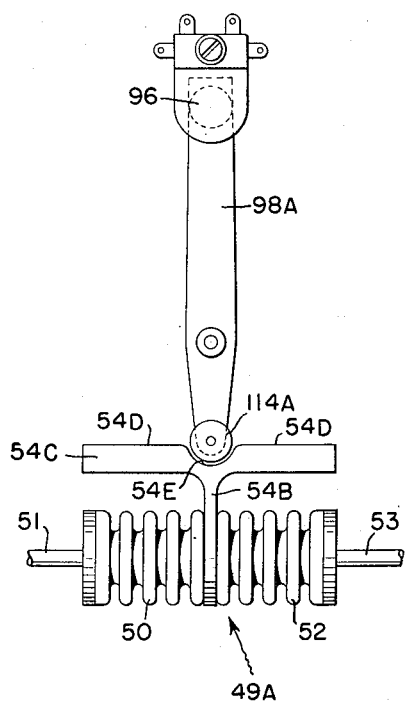

INVENTOR.
JOHN G. BOOTH
BY Arthur H. Swanson
ATTORNEY.

---

United States Patent Office 2,701,577
Patented Feb. 8, 1955

---

2,701,577

AUTOMATIC TRANSFER BETWEEN AUTOMATIC AND MANUAL REGULATING CONTROLLERS

John G. Booth, Philadelphia, Pa., assignor to Minneapolis-Honeywell Regulator Company, Minneapolis, Minn., a corporation of Delaware Original application October 14, 1947, Serial No. 779,712, now Patent No. 2,588,799, dated March 11, 1952. Divided and this application March 19, 1951, Serial No. 216,300

25 Claims. (Cl. 137—85)

This invention relates to control devices adapted to be actuated in response to a manually variable fluid pressure or to an automatically variable fluid pressure. The fluid employed is usually air although any other suitable gas or liquid may be utilized.

The control devices which are the subject of this invention are customarily employed for controlling industrial processes. In order to start such a process or in case of disturbance to or interruption of the process, it is desirable to provide means for manually controlling the process by the use of a portion of the automatic control means which govern the process when the operations are proceeding normally in the desired manner. It is desirable that the shift over or transfer of control of the process from manual to automatic control or vice versa take place without varying the conditions under which the process is operating at the time the shift is made. In the case in which the valve or other final process-controlling element is operated by a fluid-pressure-operated motor, this requires that the fluid pressure applied to the motor and the fluid pressure about to be applied to the motor be equal or at some other desired ratio. If these pressures are equal or at some other desired relation there will be no movement of the final process-controlling element and, consequently, no disturbance to the controlled process when the shift or transfer is made.

It is an object of this invention to provide means for shifting the control of the device from the automatically variable fluid pressure to the manually variable fluid pressure or vice versa when the two pressures are equal or at some preselected ratio to each other.

It is a further object of this invention to provide means for automatically transferring or shifting control of the device from the manually variable fluid pressure to the automatically variable fluid pressure or vice versa. This automatic transfer or shift is effected by a differential-fluid-pressure-operated motor whose output movement is responsive to the opposing force of the manual and of the automatic fluid pressure. When these pressures are equal or at some other preselected ratio to each other, the differential-fluid-pressure-operated motor closes a switch or valve which connects another motor (which operates the transfer valve) to its source of operating power. When so connected, this other motor is energized and moves the transfer valve to connect yet another motor (which operates the final control valve or other process-controlling element) either to the manually controlled fluid pressure or to the automatically controlled fluid pressure so that the last named motor and consequently, the process-controlling device to which it is connected, is under either manual or automatic control.

Another object of this invention is to effect the shift or transfer of control over the final control element by means of a relay valve or switch between the motor, which actuates the transfer valve, and the source of power for this motor. This relay valve is actuated by a power-circuit in response to the balance or equalization of the manually and of the automatically variable fluid pressures. This power circuit opens or closes the relay with a snap or instantaneous action and can be regulated to take place by a very short movement within narrowly defined limits. The power for the relay-actuating-circuit may be a fluid, such as air, or electricity.

The various features of novelty which characterize this invention are pointed out with particularity in the claims annexed to and forming a part of this specification. For a better understanding of the invention, however, its advantages and specific objects obtained with its use, reference should be had to the accompanying drawings and descriptive matter in which is illustrated and described a preferred embodiment of the invention.

Of the drawings:

Fig. 1 is a diagrammatic or schematic view showing a device in which the switch or transfer between automatic and manual control is effected automatically;

Fig. 3 is an electric circuit diagram of the electric relay-operating circuit of Fig. 2 controlling a single motor-operated valve;

Fig. 4 is a view in detail of a modified form of relay operating device; and

Automatic transfer of control

Figure 2:
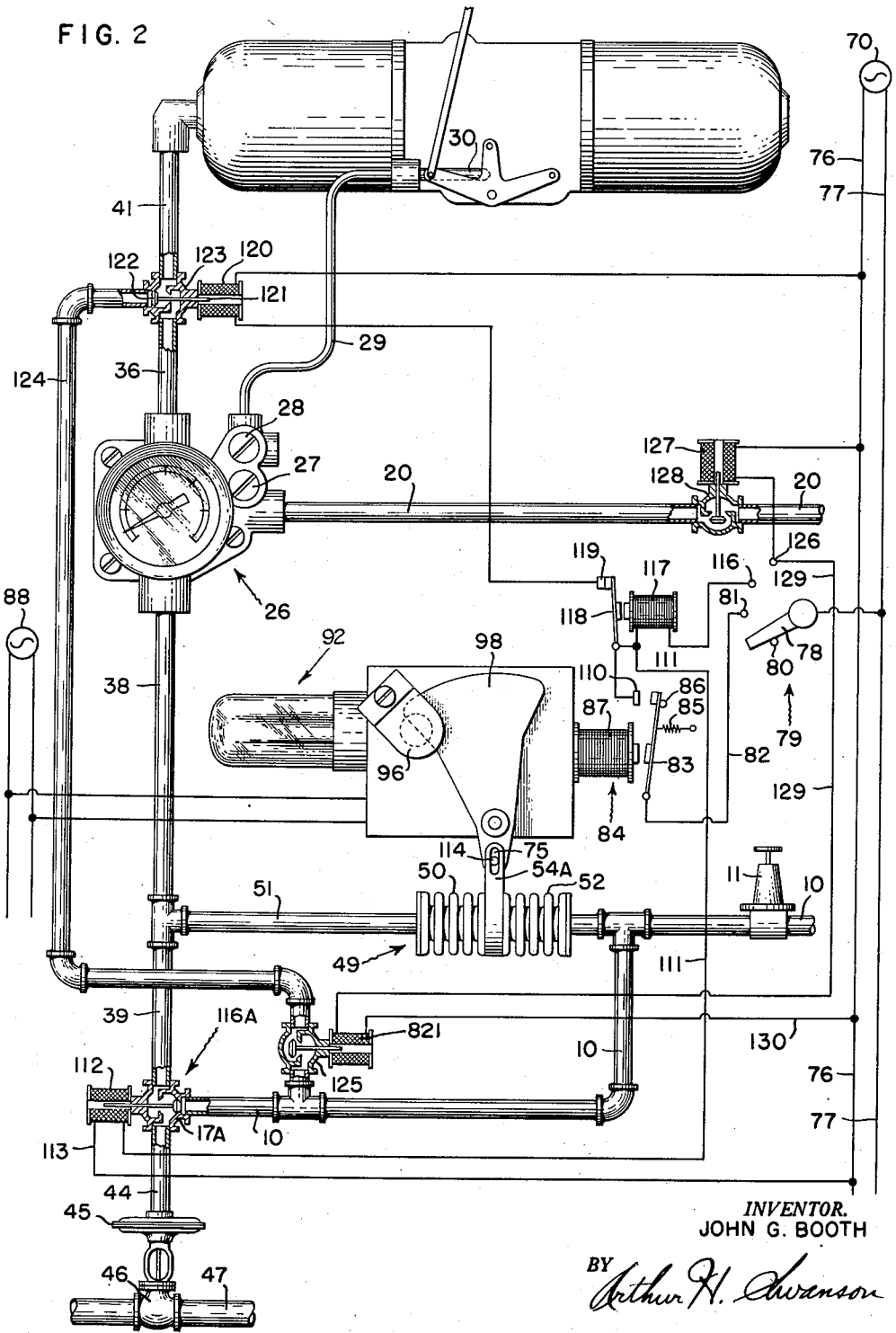
Fig. 2 is a diagrammatic or schematic view with parts shown in front elevation and in cross section of a modification of Fig. 1.

In many cases it is desirable automatically to perform the transfer or shift of the control of the process from manual control to automatic control or vice versa in response to the balance of the manually and of the automatically controlled fluid pressures. This balance may exist when these pressures are equal or when they are at some other desired ratio.

This automatic transfer of control is accomplished by having a motor, such as the differential pressure indicator 49 (Fig. 2), operate a valve or switch, which connects a motor (for operating the transfer valve 116A) so as to connect the motor 45 (which operates a final control element, such as valve 46) either to the manually regulated fluid pressure or to the automatically regulated fluid pressure. The mechanism for performing this automatic shift over or transfer is illustrated by the block diagram of Fig. 1. Fig. 1 shows a supply of fluid pressure, such as air, communicating with a pipe 10, which furnishes a supply of fluid to a manually operated pressure regulator 11, and a pipe 20, which furnishes a supply of fluid to an automatically operated pressure regulator 26. A pressure responsive device 52 is responsive to the manually regulated fluid pressure and a pressure responsive device 50 is responsive to the automatically regulated fluid pressure. The manual regulator and the automatic regulator are also connected to a transfer valve 16 which communicates by means of a pipe 44 with a motor 45 which governs the final control element (valve 46 in Fig. 2). In order to operate the transfer valve 16 automatically, a power circuit is used. This power circuit is energized either by electricity or a source of fluid pressure, such as air. The power supply 70 is connected to a manually operable valve or switch 71 which is biased towards open circuit position. On its opposite side, the manually operable switch 71 is connected to an automatically operating pressure responsive valve or switch 72 which is moved between extreme open circuit positions so that when it is in intermediate position it connects or communicates with the power supply 70 through the switch or valve 71. Electricity or fluid pressure is connected through the automatic circuit controlling device 72 to the motor 73 which has a mechanical connection 74 for actuating the movable plug or member of the transfer valve 16. Manually operated circuit controlling device 71 is biased towards its normal open circuit position in order to prevent the automatic circuit controlling device 72 from shifting or hunting back and forth between the manual and automatic positions of transfer valve 16. If manual device 71 were not open, motor 73 would be energized from source 70 and hence operated as long as the pressures in the pressure responsive devices 50 and 52 were such as to close automatic circuit controlling device 72.

Opration of automatic transfer

In order to start a process under the control of a device such as that shown in Fig. 1, the manual control 11 is manipulated so that the motor 45 moves the final control element, such as valve 46 (Fig. 2), into a desired position. At the same time, the automatic control 26 is under the control of the pressure or other energy supply which actuates motor 45, so that, when the process has reached a steady state and is operating properly, the automatic control is in correct condition or position to take over control of the process. With the device in this condition, the device 71 is manually closed against its bias so that device 72 is connected to power supply 70. If the pressure in each of the devices 50 and 52 is at the selected value or ratio to one another, device 72 closes and motor 73 is energized from power supply 70. When motor 73 has shifted transfer valve 16 so motor 45 is under the control of the automatic control 26, device 71 can be opened or allowed to open by the operation of its bias. This opening prevents motor 73 from shifting transfer valve 16 back and forth between the manually and the automatically controlling positions. When it is desired to shift from automatic to manual control, device 71 is again closed and manual control 11 is operated to bring the pressure in device 52 to the proper value. Then device 72 automatically connects motor 73 to power supply 70 and motor 73 moves transfer valve 16 into the manual control position.

*Electric relay circuit*

Fig. 2 shows an automatic shift over or transfer for a control device by means of an electrically operated relay circuit. Fluid pressure in the pipe 20 communicates with the inlet to a relay valve 26 having a filter 27 and a restrictive orifice 28 in a conduit which communicates with a bleed pipe 29 terminating in a nozzle 30 controlled by a flapper (not shown) in response to the variations of the action or condition which is to control the process.

Inlet conduit 10 contains a pressure regulator 11 and communicates with a bellows 52 of a differential pressure operated indicator 49. Conduit 10 leads to one inlet port of a transfer valve 116A. From the outlet chamber of relay valve 26 leads a pipe 36 to a valve presently to be described. Also from the outlet chamber of relay 26 leads a pipe 38 communicating with a pipe 39 connected to one inlet conduit of the transfer valve 116A. From the outlet side of the transfer valve 116A a pipe 44 leads to the fluid pressure actuated motor 45 which controls the valve 46 in the process-controlling conduit 47. Pipe 51 communicates with the outlet pressure of relay valve 26 by means of a conduit 38 and leads to a second bellows 50 of the differential operated motor 49. Bellows 50 and 52 carry a strip 54A having a slot 75 in it.

A source of power 70, such as alternating current electricity, is connected to the power lines 76 and 77. Line 77 is connected to movable member 78 of a selector switch, generally indicated at 79, and having a stop 80 which limits its movement in one direction. Stationary contact 81 is connected by a power lead 82 to the movable member 83 of a relay, generally indicated at 84. Movable member 83 is biased by a spring 85 to open circuit position against stop 86. Coil 87, when energized, attracts movable member 83 against the bias of spring 85. Coil 87 is energized by an electronic circuit shown in detail in Fig. 3. This electronic circuit is part of apparatus disclosed in greater detail in the following copending applications: Serial No. 694,399 James C. Mouzon, Control Apparatus, filed August 31, 1946, and now abandoned; Serial No. 694,401, W. H. Wannamaker, Control Apparatus, August 31, 1946, Patent 2,564,937, patented August 21, 1951. Fig. 3 shows that this electronic circuit is connected to a source of electric power 88, which energizes a transformer 89 having a secondary winding 90 connected, at one terminal, to one terminal of the relay-operating winding 87 and to one terminal of a by-pass condenser 91. The opposite ends of winding 87 and condenser 91 are connected to one plate 93 of a double triode electronic valve, generally indicated at 92. Valve 92 may conveniently be of the commercially available type 7N7. The valve (composed of plate 93, grid 94 and filament 95) does or does not operate as an oscillator depending upon the mutual inductance of suitably disposed inductance coils 96 and 97. The mutual inductance of coils 96 and 97 is varied according to the position of a pivotally mounted vane 94, which is a sector-shaped piece of stamped metal of good conductivity, such as copper or aluminum.

Vane 98 may be provided with suitable ribs to give greater strength and rigidity. Fig. 2 shows vane 98 and the coil 96. The coils 96 and 97 are spiral and are embedded in a casing of resinous plastic material. The coils and their surrounding casing are separated by a narrow notch or gap through which the vane 98 is freely movable. The valve comprising plate 99, grid 100 and filament 102 does not oscillate under any normal condition of operation. A by-pass condenser 103 is connected between the plates of the valve 92 and a second terminal of transformer winding 90. This transformer terminal is grounded at 104. A condenser 105 is connected in parallel with coil 96 to 99. Filament 95 is connected to ground 104 through a biasing resistor 106. The controls grids 94 and 100 are connected to ground 104 through resistance 107 and by-pass condenser 108 parallel with it. Condenser 91 prevents the movable member 83 of the relay 84 from chattering as a result of a pulsating current flowing through it due to the A. C. energization of the oscillator. Suitable values of the circuit components are as follows: Power sources 70 and 88 may be branches of an ordinary electric light or power system supplying current at about 115 volts at a freqnency of about 60 cycles per second. The resistance of resistor 106 is 500 ohms, the resistance of the resistor 107 is 0.5 megohm. The capacity of the condenser 103 is 0.005 microfarad, of condenser 108 is 0.015 microfarad of condenser 91 is 8 microfarads, of condenser 105 is 5 microfarads. The coil 96 comprises 9.5 and the coil 97 comprises 7.5 convolutions or turns of number 31, B. & S. gauge, copper wire. That wire is less than 0.009 inch in diameter. The inside diameter of the inner convolution of each coil is 3/8 of an inch. The greatest width of each casing for the coils is about 7/8 of an inch. The space through which the vane 98 travels is 1/8 inch thick.

The operation of this electronic circuit is explained in greater detail in the applications above referred to. In general, when the electronic circuit has been connected to its sources of power for a sufficient time for the electronic valve 92 to be heated and to be in operating condition, if the vane 98 is moved between the coils 96 and 97 in such a direction as to decrease the mutual inductance of these coils the high frequency oscillation of the circuit is interrupted. When this high frequency oscillation is interrupted, the current flowing through the relay winding 87 increases, and the armature contact 83 is attracted by the relay winding 87 against the bias of its spring (not shown) and is brought into engagement with the cooperating stationary contact 110.

Referring now to Fig. 2, it will be seen that the stationary contact 110 is connected to a lead or wire 111 which connects to an electric motor 112, shown as the coil of a solenoid. Lead or wire 113 connects the opposite side of motor 112 to the line 76. Motor 112 is biased (by means not shown in the drawings) so that the movable member of the valve 116A is normally in the position in which it is shown in Fig. 2. In this position the movable valve plug or member 17A closes off conduit 10 and opens connection to conduits 39 and 44 so that the fluid pressure operated motor 45 is under the control of the automatically variable mechanism.

*Operation of electric automatic transfer*

If it is desired to shift the control of the device from the automatic position, in which it is shown in Fig. 2, to the manual position, in which the motor 45 is under the control of the manually operated pressure regulator 11, the switch 79 is manually operated by turning the movable switch arm 78 into contact with the stationary switch contact 81. This energizes the movable relay contact 83. If the automatically controlled fluid pressure in bellows 50 and the manually controlled fluid pressure in bellows 52 are equal or at some other ratio at which the differential pressure operated motor 49 is designed to operate, the motor 49 will rotate the vane 98 by engagement of the pin 114 in the slot 75 so that the vane 98 moves between the coils 96 and 97 (the latter is beneath coil 96 in Fig. 2 and therefore not shown). This varies the mutual inductance of coils 96 and 97, interrupts the oscillation of the electronic apparatus and causes relay winding 87 to be energized, which moves movable relay contact 83 into engagement with the stationary contact 110. This closes circuit across source 70 from line 77, switch blade 78, switch contact 81, wire 82, relay contact 83, stationary contact 110, line 111, motor 112, and line 113 to the lead wire 76. This energization of the motor 112 causes movable valve member 17A to open communication between pipes 10 and 44 and to close communication between pipes 39 and 44.

If it is desired to shift from the manual position to the automatic position shown in Fig. 2 the motor 112 is deenergized by turning selector switch 79 counterclockwise as seen in Fig. 2 out of engagement with stationary switch contact 81 into the position shown in Fig. 2.

The circuit shown in Fig. 2 is provided with a test position. In this position, the selector switch 79 is manually moved so that the movable switch blade 78 contacts the stationary switch contact 116. This energizes motor 117 and moves movable relay contact 118 out of contact with stationary relay contact 119. Contacts 118—119 control the connection of solenoid motor 120 across the terminal wires 76 and 77. Motor 120 has a slidable armature 121 which operates movable member 122 of a three-port valve 123. A pipe 124, controlled by a two-position valve 125, communicates with pipe 41 when the control system is under manual control. When the control system is in automatic position or in test position, pipe 41 communicates with pipe 36.

The control device is also provided with a service position. In service position, movable switch contact 78 engages stationary contact 126 and thus throws motor 127 of a two-position valve 128 across the terminal lines 76 and 77. Energization of motor 127 closes valve 128 and shuts off the supply of air through the inlet conduit 20 to the automatically actuated control apparatus. In parallel with motor 127 is motor 821 of the two-position valve 125 by means of wires 129 and 130. Energization of motor 821 closes valve 125 and shuts off the supply of manually controlled air from inlet conduit 10 to valve 123.

Fig. 4 shows a modified form of a differential pressure operated motor. This modification 49A has pipe 51 communicating with bellows 50 and pipe 53 communicating with bellows 52. The bellows operated member 54B carries a cam 54C having two flat cam faces 54D and a notched cam face 54E. This notched cam face cooperates with a cam follower 114A pivotally mounted on the vane 98A whose opposite end moves between the coil 96 and the coil 97, which is mounted directly beneath coil 96 and which is not visible in Fig. 4. Vane 98A operates to vary the self induction of coils 96 and 97, which are connected in an electronic circuit, similar to that shown in Fig. 10, and containing a relay winding which is energized when the high frequency oscillation of the circuit is sufficiently reduced.

Figure 5:
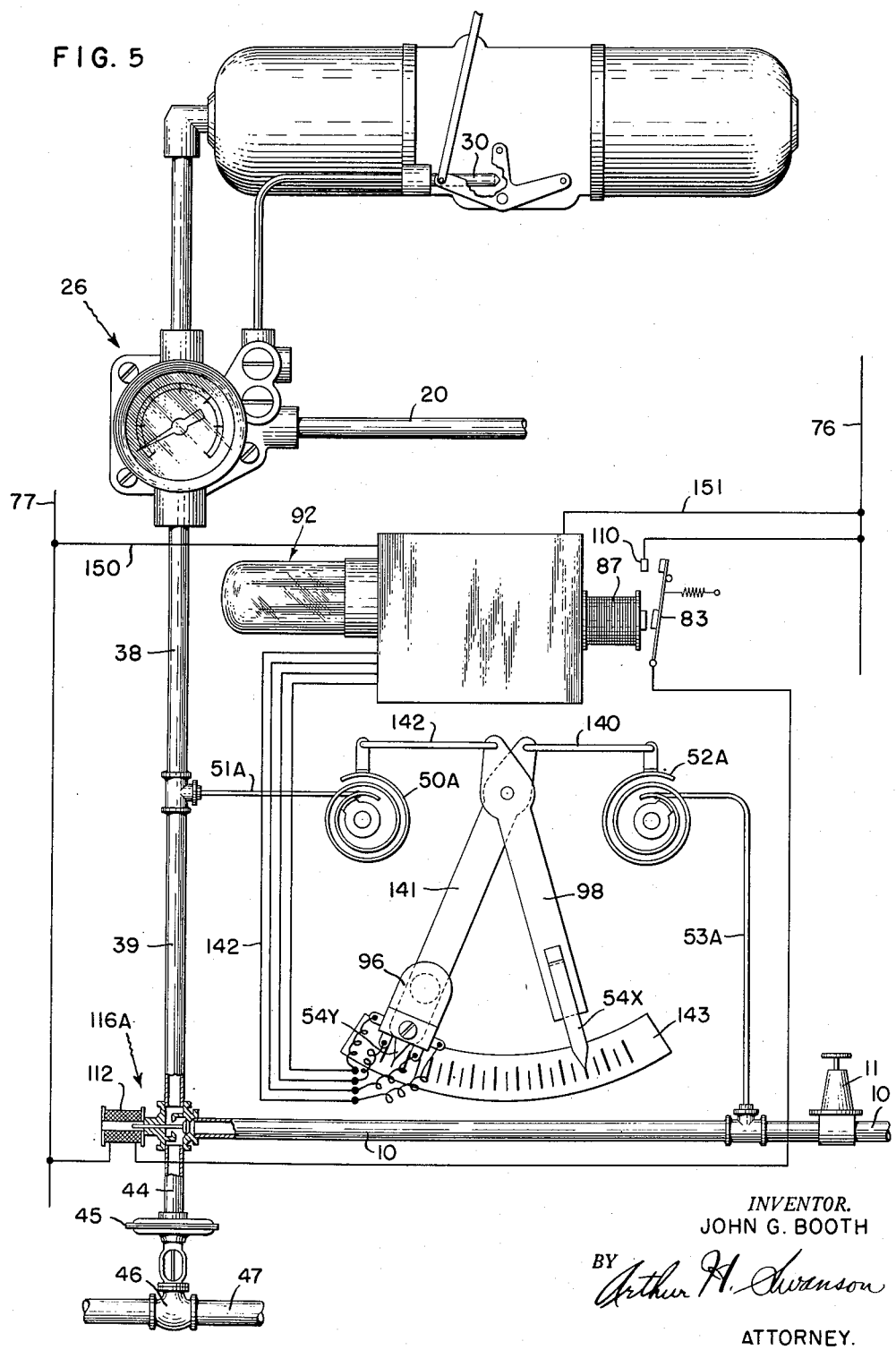
Fig. 5 is a diagrammatic or schematic view with parts shown in front elevation or in cross section of another modification.

Fig. 5 shows a modification of the control apparatus in which the vane 98 and the coils 96 and 97 are both mounted for movement, each in response to one of the control fluid pressure. Coil 97 is beneath coil 96 and is therefore invisible in Fig. 5. Air enters through the inlet conduit 10 and the manually controlled pressure regulator 11 and passes through the pipe 53A to the Bourdon or spiral tube 52A whose movable end is pivotally connected by means of a link 140 to the pivotally mounted lever or arm 141 on which the coils 97 and 96 are mounted.

Air for the automatically variable device is supplied through inlet conduit 20 to the relay valve 26 connected to the nozzle 30 which is automatically controlled by means of a flapper (not shown) in response to that action or condition to which it is desired to have the process respond. The air outlet chamber of the relay valve 26 is connected to the pipe 38 and pipe 39. This pressure is applied through pipe 51A to a second spiral or Bourdon tube 50A. The free or movable end of tube 50A is pivotally linked by a connection 142 with the end of the vane 98. Vane 98 and the support 141 for the coils 96 and 97 are both movable over and past a scale 143 so that vane 98 and support 141 serve to indicate the automatically and the manually regulated air pressure, respectively. Moreover vane 98 and support 141 may be adjusted so that the vane 98 interrupts the mutual inductance of the coils 96 and 97 at a desired value of the manual fluid pressure and of the automatic fluid pressure. The end of the longer arm of vane 98 is in a proper plane to pass between the coils 96 and 97. This end of vane 98 carries a pointer 54X which is bent out of the plane of coils 96 and 97 and thus passes these coils while pointer 54X nevertheless cooperates with the markings on scale 143. Support 141 also carries a pointer 54Y which is readable against 143. The coils 96 and 97 are connected into a circuit as shown in Fig. 3 by means of a plurality of flexible lead wires 142. This circuit includes electronic valve 92 and the relay winding 87. The movable relay contact 83 cooperates with the stationary contact 110 to connect the electric motor 112 of the transfer valve 116A across the power circuit consisting of the lines 76 and 77. Fig. 5 shows the wiring as being connected across the power supply lines 76 and 77 which are located at opposite sides of the figure. Power supply for the electronic relay operating circuit is connected across these leads 76 and 77 by means of wires 150 and 151. Depending upon the position of the transfer valve 116A, manually controlled air (from the supply pipe 10) or automatically controlled air (from the supply pipe 20, the relay valve 26, and the pipes 38 and 39), is conducted through the pipe 44 to the fluid pressure operated motor 45 which controls the valve 46 governing the flow through the conduit 47.

*Summary*

From the foregoing it will be seen that this invention provides means for operating a transfer valve which shifts the control of a final process-controlling element between a manually controlled and an automatically controlled fluid pressure. The operation of this transfer valve may be either manual or automatic. The power for operating the transfer valve automatically may be either electricity or a fluid, such as air. By means of a relay controlling the motor which operates the transfer valve, the switch over or transfer of control can take place with a snap or substantially instantaneous movement. The values of the manual and the automatic variable pressures at which this transfer takes place can be adjusted very precisely to any point in a selected range of values.

This application is a division of my copending application Serial Number 779,712, filed October 14, 1947, now Patent 2,588,799, granted March 11, 1952.

While in accordance with the provisions of the statutes, I have illustrated and described the best forms of the invention now known to me, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described my invention what I claim as new and desire to secure by Letters Patent is as follows:

1. In a fluid-pressure-operated automatic controller, the combination including, piping for connection to a supply of fluid for furnishing the motive power, a pressure regulating device connected to said piping and automatically operable in response to a variable selected to govern the operations of the controller, a by-pass connection communicating with said piping in parallel to said device, a manually operable pressure regulating device forming part of said by-pass connection, a control valve for regulating an action or condition which is to be controlled, a transfer valve for connecting said control valve to said automatically operating device and for shutting off said control valve from said by-pass connection and vice versa, a motor for actuating said transfer valve to vary said connections, and a pressure operated controller responsive to the pressure in said by-pass and in said automatic regulating device and actuating said motor when said pressures are at a selected ratio.

2. In an automatic controller adapted to be either automatically or manually operated by applying an automatically adjusted pressure or a manually adjusted pressure to a pressure operated valve, means for shifting automatically the connection between said valve and one of said pressures without disturbing the value of the pressure applied to the valve at the time that the shift is made, said means including, a motor for actuating the valve to make the shift, connections from said motor adapted for connection to a supply of motive power for said motor, a controller in said connections for connecting and disconnecting said motor and said supply, and pressure operated mechanism responsive to said automatically adjusted pressure and to said manually adjusted pressure for changing the condition of said controller when said pressures have prechosen values.

3. In an air-operated control system, a control valve for changing the value of an action or condition, an air-pressure-controlling device automatically responsive to a variable selected for governing the operation of the control valve, an air-pressure-controlling device manually operable for governing the operation of the control valve, mechanism for connecting said control valve under the control of the automatically variable air pressure from the device automatically responsive to a variable or under the control of the manually variable air pressure from the device manually operable, and motor mechanism for operating said last mentioned mechanism to connect said control valve to one of said pressures and to disconnect it from the other of said pressures, said motor mechanism being actuated when the pressures in said air-pressure-controlling devices are within a previously determined range of values.

4. Automatic means for shifting the controlling power applied to an automatic regulator from a controlling power which is automatically variable in response to a selected control variable to a controlling power which is manually variable or vice versa, said means including, mechanism responsive to the automatically variable power, mechanism responsive to the manually variable power, a final control element varying an action or condition selected for control, transfer mechanism for shifting control of said final control element from the automatically variable power to the manually variable power or vice versa, and connecting-and-disconnecting mechanism actuated by said responsive mechanisms when the automatically variable power and the manually variable power bear a relationship to each other to which the mechanism is set, said connecting-and-disconnecting mechanism being connected to said transfer mechanism to actuate it.

5. In an air-pressure-operated automatically-or manually-operated system for operating a control valve, an air-pressure-operated device responsive to air pressure which is automatically variable in response to a variable selected to govern the system, an air-pressure-operated device responsive to a manually variable air pressure, a transfer valve for shifting the connection of the control valve from the automatically variable air pressure to the manually variable air pressure and vice versa, operating mechanism for said transfer valve to cause said shift, and a connection for supplying power to or disconnectng power from said operating mechanism operable when the air pressures in said devices are in a desired ratio to one another.

6. In a pneumatically operated controller for a control valve governing a controlled action or condition and operable by automatically variable air pressure or by manually variable air pressure, the combination including, a connector selectively operable to place said control valve in communication with said automatically variable air pressure or with said manually variable air pressure, a device responsive to said manually variable air pressure, a device responsive to said automatically variable air pressure, an oscillatory electric circuit having in circuit connection therein elements controlling the oscillation or the lack of oscillation of said circuit, and an element mounted movable under the control of said devices and movable in association with said circuit elements so as to instantaneously start or stop the oscillation of said circuit when the pressures to which said devices are responsive are at desired values relative to each other.

7. In an air-pressure-operated automatically or manually actuated system for a control valve, the combination including, an air-pressure-operated device responsive to an automatically variable air pressure, an air-pressure-operated device responsive to a manually variable air pressure, a transfer valve controlling the connection of the control valve to said automatically variable air pressure or to said manually variable air pressure, an air-pressure-operated motor operating said transfer valve so as to vary the connections, inlet connections for providing a supply of compressed air to said motor, and an inlet valve responsive to said air pressure operated devices so as to open or close the inlet connections to said motor when the air pressures in said devices ar balanced against each other.

8. Automatic means for shifting the supply of compressed air applied to an air-pressure-operated valve from a supply of air which is automatically variable in response to a variable which is selected to control the valve to a supply of air which is manually variable or vice-versa, said means including, an air-pressure-operated mechanism responsive to the manually variable air pressure and to the automatically variable air pressure, an air-pressure-operated transfer valve for shifting control of said control valve from said automatically variable air pressure to said manually variable air pressure or vice versa, an air-pressure-operated valve controlling the supply of air to said transfer valve so as to cause actuation of said transfer valve, said last named valve being movable in response to the actuation of said air-pressure-operated mechanism at a selected ratio between said automatically variable air pressure and said manually variable air pressure, and an indicator connected to said mechanism to show the position of said mechanism.

9. A mechanism for automatically shifting the air applied to a valve from a supply of air which is automatically variable in response to a variable condition selected for controlling a process to a supply of air which is manually variable or vice versa, said mechanism including, a device movable in response to the automatically variable air pressure, a device movable in response to the manually variable air pressure, an air-pressure-operated transfer valve arranged to connect said control valve to said automatically variable air pressure and to disconnect said control valve from said manually variable air pressure or the reverse, an inlet valve controlling a supply of air to said transfer valve, an air-pressure-operated motor controlling the movement of said inlet valve, and a controller for said motor operated in response to the balance of pressures in said pressure responsive devices and controlling the operation of said motor.

10. A differential air-pressure-operated motor mechanism for controlling the connection of an air-pressure-operated control valve to an automatically variable air pressure or to a manually variable air pressure, said motor mechanism including, a member movable in opposite directions in response to said automatically variable air pressure and to said manually variable air pressure, a relay connected under the control of said member so as to be actuated when the ratio between said pressures is at a desired value, and a motor-operated transfer valve connected under the control of said last mentioned relay for connecting and disconnecting said control valve.

11. A differential-air-pressure-operated motor mechanism for shifting an air-pressure-operated valve, which controls a variable selected for control from an automatically corrected air pressure to a manually corrected air pressure or the reverse, said motor mechanism including, a bellows connected to said automatically corrected air pressure, a bellows connected to said manually corrected air pressure, said bellows moving in opposite directions in response to said air pressure, a relay connected under the control of said bellows so as to be operated when the pressures in said bellows are in a predetermined ratio, a motor operated by a supply of power controlled by said relay, and a transfer valve operated by said motor for switching the connections to said control valve.

12. A motor means for automatically shifting the connection between an air-pressure-operated motor controlling a valve governing a process variable and either a manually variable source of air or an automatically variable source of air for said motor, said means including, a casing, an air-pressure-operated bellows located within said casing and communicating with said manually variable source of air, a second bellows located within said casing and communicating with said automatically variable source of air, said bellows being movable in responsive to said air pressures in opposing directions, an indicator connected to said bellows so as to be movable in accordance with the differential movement of said bellows and projecting from said casing, a stationary scale for indicating the movement of said indicator, an inlet valve controlling a supply of air pressure, said inlet valve being operated in response to the differential movement of said bellows when the pressures in said bellows are at a definite ratio, an air pressure operated motor operated under the control of said inlet valve, and a transfer valve movable by said motor for connecting either said automatically variable air pressure or said manually variable air pressure to said control valve.

13. In a control system for automatically shifting the connection of an air-pressure-operated control valve to an automatically variable air pressure or to a manually variable air pressure, the combination with, a motor-operated transfer valve controlling said connections of a member movable in opposite directions in response to said automatically variable air pressure and to said manually variable air pressure, a relay connected under the control of said member so as to be actuated when the ratio between said pressures is at a desired value, of a relay-actuating electronic circuit including an electronic valve comprising an anode, a cathode, and a control grid, a source of energizing voltage having one terminal connected to ground, a winding for said relay and an inductance coil connected in series with said winding between the second terminal of said source and said anode, a condenser connecting the connected ends of said coil and winding to ground, a second inductance coil in mutual inductive relation with the first mentioned coil through which said cathode is connected to ground, a ground connection to said control grid comprising a resistance and a by-pass condenser through which said grid is maintained at the potential of the ground for alternating current operation, and a vane operating in response to the movements of said member to vary the mutual inductance of said coils between a value at which the valve will and a value at which the valve will not act as an oscillator generating high frequency alternating currents which cause said relay winding to be deenergized when said oscillator is oscillating.

14. In a control system for shifting an air-pressure-operated valve which controls a selected variable from an automatically corrected air pressure to a manually corrected air pressure or the reverse, a combination with said valve and an air-pressure-operated transfer valve for shifting the connections to said control valve, of, a motor movable in opposite directions in response to said automatically corrected air pressure and to said manually corrected air pressure, a relay having a winding operable when energized to move the contacts of the relay, an electronic valve having an anode, a cathode and a control grid, a source of alternating voltage having one terminal grounded and having a second terminal connected to the anode of said valve, an inductive element connecting the cathode of said valve to ground, an inductive element connecting the anode of said valve to the ungrounded terminal of said source, and a grounded connection to the control grid of the valve comprising a resistance and a by-pass condenser in parallel therewith, said inductive elements forming a feed back connection movable to provide a feed back between the input and output circuits of the valve and to therefore cause oscillation or lack of oscillation of said valve, said relay winding being connected so as to be energized when said valve ceases to oscillate.

15. In an automatically operated control circuit for shifting the supply of compressed air for an air-pressure-operated control valve from a supply of air which is automatically variable in response to a variable which is selected to control the valve to a supply of air which is manually variable or vice versa, the combination with a transfer valve arranged to vary the connections to said control valve, an electric motor for operating said transfer valve, and relay switch contacts controlling the supply of electricity to said motor, of, an air-pressure-operated motor connected so as to move in response to any difference between said automatically variable air pressure and said manually variable air pressure, an electronic valve comprising an anode, a cathode and a control grid, a source of alternating energizing voltage having one terminal connected to ground, a relay winding and a relay condenser connected in parallel with said winding between the second terminal of said source and said anode, a first inductance coil and a first condenser in parallel with said first inductance coil, each having one end connected to said anode, a second condenser connecting the other ends of said first inductance coil and said first condenser to said ground, a second inductance coil in mutually inductive relation with said first inductance coil and through which said cathode is connected to ground, a ground connection to said control grid comprising resistance and a by-pass condenser through which said grid is maintained at the potential of the ground for alternating current operation, and a mutual-inductance-varying element operating in response to the movements of said air-pressure-operated motor to vary the mutual inductance of said coils between a value at which the valve will, and a value at which the valve will not, act as an oscillator generating high frequency alternating current, said relay winding being energized when the valve is not acting as an oscillator.

16. In a control circuit for automatically shifting the connection between an air-pressure-operating motor controlling a valve governing an action or a condition and either a manually variable source of air or an automatically variable source of air for said motor, a combination with a transfer valve for connecting said automatically variable air pressure or said manually variable air pressure to said control valve, an electric motor for operating said transfer valve, and a relay having an operating winding and contacts controlling the connection of a supply of electricity to said electric motor, of, a differential-air-pressure-operated motor responsive to any difference between the pressure of said automatically variable air and said manually variable air, an electronic valve having an anode, a cathode and a control grid, a grid circuit containing an oscillating coil and forming an input circuit for said electronic valve, a plate circuit containing a second oscillating coil and forming an output circuit for said electronic valve, said oscillating coils being mounted for movement relative to each other in response to the movements of said differential-air-pressure-operated motor so that said oscillating coils are located so as to provide feed back coupling between said grid and said plate circuits when the pressures of said manually variable air and of said automatically variable air have a selected ratio to one another, thereby causing high frequency oscillation of said circuit, consequent energization and operation of said relay winding resulting when said high frequency oscillation is not occurring.

17. In an air-pressure-operated automatically or manually actuated system for a control valve, the combination with a device responsive to automatically variable air pressure, a device responsive to manually variable air pressure, a transfer valve for shifting the connection of said control valve between the automatically variable air pressure and the manually variable air pressure, an electric motor operating said transfer valve to cause said shift, and a relay having operating winding and contacts controlling the supply of electricity to said electric motor of, an oscillator including an electronic valve having a plate circuit forming the output therefrom and a grid circuit forming the input thereto, an oscillator coil in said output circuit movable under the control of one of said variable air pressure responsive devices, an oscillating coil connected in said input circuit and movable under the control of the other of said variable air pressure responsive devices, the movements of said coils under the control of said devices being such that said coils are aligned when said air pressures have a desired ratio to one another so that said coils cause feed back from the output circuit to the input circuit of said electronic valve thereby causing oscillation of said circuit, energization of said relay winding thus operating said relay contact when said circuit is not oscillating.

18. In a control circuit having an air-pressure-operated automatically or manually actuated control valve, the combination with a transfer valve for connecting said control valve to an automatically variable air pressure or to a manually variable air pressure, an electric motor for operating said transfer valve, and a relay having relay contacts controlling the connection of a supply of electricity to said electric motor and having a relay winding for operating said contacts, of, an electric oscillator including a thermionic tube having at least three electrodes and having a grid circuit forming an input thereto and a plate circuit forming an output therefrom, a pair of inductance coils, one of said inductance coils being connected in said input circuit and the other of said inductance coils being connected in said output circuit, said coils being mounted in such relation to each other so as to provide regenerative coupling between said output and said input circuits thereby providing high frequency oscillation of the circuit containing said electronic valve and consequent energization of said relay winding to operate said relay contacts, a device for adjusting said coupling and thereby establishing and interrupting said oscillation, and a differential air-pressure-operated motor responsive to said manually variable air pressure and to said automatically variable air pressure so as to move said coils and said device relative to each other so that said device causes or interrupts said oscillation instantaneously when the manually variable air pressure and the automatically variable air pressure balance.

19. A relay operating circuit for controlling an electric motor operating a transfer valve controlling the connection of a control valve to an automatically variable air pressure or to a manually variable air pressure, said relay operating circuit including, a relay winding controlling the operation of relay contacts making and breaking connection to said electric motor, an electronic valve having a grid or input circuit containing an inductance coil and a plate or output circuit containing said relay winding and a second inductance coil, said inductance coils being spaced from each other so as to provide feed back between said output circuit and said input circuit, a metallic element mounted for movement between and away from said coils so as to quickly initiate and interrupt the feed back between said coils and consequently the oscillation of the circuit containing said electronic valve, and an air-pressure-operated motor movable in response to said automatically variable air pressure and said manually variable air pressure and controlling the movement of said metallic element to initiate or interrupt said oscillation immediately upon said air pressures attaining a definite ratio to each other.

20. In an air-pressure-operated automatically or manually actuated system having a control valve, means for shifting automatically between manual and automatic actuation without disturbing the value of the air pressure being impressed on the control valve at the time of the shift, said means including, a differential-air-pressure-operated device responsive to the automatically actuated air pressure and to the manually actuated air pressure, a transfer valve for shifting the connection of the control valve from the automatically actuated air pressure to the manually actuated air pressure and vice versa, an electric motor operating said transfer valve, and an electric switch movable by said device so as to control the connection between said motor and a source of electricity and thereby cause said transfer valve to shift the connections between the control valve and the automatically or the manually actuated air pressure when said pressures are equal or at another desired ratio.

21. In an air-pressure-operated automatically or manually actuated system having a control valve, means for shifting automatically between manual and automatic actuation without disturbing the value of the air pressure being impressed on the control valve at the time of the shift, said means including, a differential-air-pressure operated device responsive to the automatically actuated air pressure and to the manually actuated air pressure, a transfer valve for shifting the connection of the control valve from the automatically actuated air pressure to the manually actuated air pressure and vice versa, an electric motor operating said transfer valve, an electric switch movable by said device so as to control the connection between said motor and a source of electricity and thereby cause said transfer valve to shift the connections between the control valve and the automatically or the manually actuated air pressure when said pressures are equal or at another desired ratio, and a second electric switch connected in series circuit with said above mentioned electric switch and adapted for manual operation.

22. In an air-pressure-operated control system, a manually operated air pressure regulator, an air pressure regulator automatically operable in response to a controlling action or condition, a follow-up element connected to the output side of said automatically operable regulator, a first electric motor operating a transfer valve controlling the air output from said regulators, a second electric motor operating a valve in the air connection between said automatic regulator and said follow-up element and in the air connection between said manual regulator and said follow-up element, an air-pressure-operated motor connected to the output side of each of said regulators, and an electric switch controlling the connections between said electric motors and a supply of electricity in response to the operation of said air-pressure-operated motor.

23. In an air-pressure-operated control system, a manually operated air pressure regulator, an air pressure regulator automatically operable in response to a controlling action or condition, a follow-up element connected to the output side of said automatically operable regulator, a first electric motor operating a transfer valve controlling the air output from said regulators, a second electric motor operating a valve in the air connection between said automatic regulator and said follow-up element and in the air connection between said manual regulator and said follow-up element, an air-pressure-operated motor connected to the output side of each of said regulators, an electric switch controlling the connections between said electric motors and a supply of electricity in response to the operation of said air-pressure-operated motor, a third electric motor controlling a second valve in the air connection between said manual regulator and said follow-up element, and a manually operably electric switch controlling the connections between said third electric motor and a supply of electricity for operating said motor.

24. In an air-pressure-operated control system, a manually operated air pressure regulator, an air pressure regulator automatically operable in response to a controlling action or condition, a follow-up element connected to the output side of said automatically operable regulator, a first electric motor operating a transfer valve controlling the air output from said regulators, a second electric motor operating a valve in the air connection between said automatic regulator and said follow-up element and in the air connection between said manual regulator and said follow-up element, an air-pressure-operated motor connected to the output side of each of said regulators, an electric switch controlling the connections between said electric motors and a supply of electricity in response to the operation of said air-pressure-operated motor, an additional electric motor controlling a valve in the air inlet connection to said manual regulator, and a manually operable electric switch controlling the connections between said additional electric motor and a supply of electricity for operating said motor.

25. In an air-pressure-operated control system, a manually operated air pressure regulator, an air pressure regulator automatically operable in response to a controlling action or condition, a follow-up element connected to the output side of said automatically operable regulator, a first electric motor operating a transfer valve controlling the air output from said regulators, a second electric motor operating a valve in the air connection between said automatic regulator and said follow-up element and in the air connection between said manual regulator and said follow-up element, an air-pressure-operated motor connected to the output side of each of said regulators, an electric switch controlling the connections between said electric motors and a supply of electricity in response to the operation of said air-pressure-operated motor, relatively movable relay contacts connected in the electric circuit between said second motor and the above-mentioned electric switch, a relay winding for actuating said relay contacts, and a manually operable electric switch in the electric circuit between said relay winding and a supply of electricity.

References Cited in the file of this patent

UNITED STATES PATENTS

| | | |
|---|---|---|
| 2,369,887 | Eckman | Feb. 20, 1945 |
| 2,476,104 | Mason | July 12, 1949 |
| 2,564,937 | Wannamaker | Aug. 31, 1949 |
| 2,612,902 | Ward | Oct. 7, 1952 |